(12) United States Patent
Hwang et al.

(10) Patent No.: US 11,327,321 B2
(45) Date of Patent: May 10, 2022

(54) ELECTRONIC DEVICE

(71) Applicant: LG ELECTRONICS INC., Seoul (KR)

(72) Inventors: Changkyu Hwang, Seoul (KR); Kyoungtae Kim, Seoul (KR); Seungyong Shin, Seoul (KR); Seong Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 16/490,061

(22) PCT Filed: May 27, 2019

(86) PCT No.: PCT/KR2019/006302
§ 371 (c)(1),
(2) Date: Aug. 29, 2019

(87) PCT Pub. No.: WO2020/241909
PCT Pub. Date: Dec. 3, 2020

(65) Prior Publication Data
US 2021/0333560 A1 Oct. 28, 2021

(51) Int. Cl.
*G02B 27/01* (2006.01)
*G02C 5/14* (2006.01)
(Continued)

(52) U.S. Cl.
CPC ......... *G02B 27/0176* (2013.01); *G02C 5/146* (2013.01); *G02C 5/20* (2013.01);
(Continued)

(58) Field of Classification Search
CPC ........ G02B 27/0176; G02B 2027/0178; G02C 5/20; G02C 5/22; G02C 5/146; G02C 5/124
See application file for complete search history.

(56) References Cited

U.S. PATENT DOCUMENTS 5,133,595 A * 7/1992 Gutbrod .................. G02C 5/20
351/111
5,929,966 A * 7/1999 Conner .................... G02C 5/20
351/118
(Continued)

FOREIGN PATENT DOCUMENTS

CH 654199 A5 * 2/1986 ............ G02C 7/105
JP 2011065017 3/2011
(Continued)

OTHER PUBLICATIONS

Machine translation of KR 101819068 retrieved from KIPO Sep. 8, 2021 (Year: 2021).*
(Continued)

*Primary Examiner* — Cara E Rakowski
(74) *Attorney, Agent, or Firm* — Lee Hong Degerman Kang Waimey

(57) ABSTRACT

The present invention relates to an electronic device. More particularly, the present invention relates to an electronic device used in virtual reality (VR), augmented reality (AR), mixed reality (MR), etc.
Disclosed herein is an electronic device which includes: a frame including at least one opening and worn on a human body of a user; a control unit fixed to the frame and generating an image; and a display unit fixed to the opening of the frame and showing the image to the user, in which the frame includes a front frame including the at least one opening and first and second side frames which extend in a first direction crossing the front frame at both ends of the front frame and are parallel to each other, and at least one of a first length of each of the first and second side frames and a first interval between the first side frame and the second side frame is adjustable.

5 Claims, 10 Drawing Sheets

(a)

(b)

(51) Int. Cl.
*G02C 5/20* (2006.01)
*G02C 5/22* (2006.01)
*G02C 5/12* (2006.01)

(52) U.S. Cl.
CPC ........ *G02C 5/22* (2013.01); *G02B 2027/0178* (2013.01); *G02C 5/124* (2013.01)

(56) References Cited

U.S. PATENT DOCUMENTS

| | | | | |
|---|---|---|---|---|
| 2002/0067461 | A1* | 6/2002 | Bell | G02C 5/124 351/128 |
| 2010/0245754 | A1* | 9/2010 | Matsumoto | G02B 27/0176 351/158 |
| 2018/0024369 | A1* | 1/2018 | Kato | G02B 27/0176 359/13 |

FOREIGN PATENT DOCUMENTS

| | | |
|---|---|---|
| JP | 2015200757 | 11/2015 |
| KR | 1020030018958 | 3/2003 |
| KR | 1020080101705 | 11/2008 |
| KR | 1020150129998 | 11/2015 |
| KR | 101819068 B1 * | 1/2018 ............. G02C 7/105 |

OTHER PUBLICATIONS

Machine translation of CH 654199 retrieved from Espacenet Sep. 8, 2021 (Year: 2021).*
PCT International Application No. PCT/KR2019/006302, International Search Report dated Feb. 25, 2020, 5 pages.

* cited by examiner (a)                                          (b)

(a)

(b)

(c)

(d)

(e)

(f)

(a)

(b)

(a)

(a)

(b)

(a)

(b)

(c)

(d)

(a)

(b)

(a)

(b)

ELECTRONIC DEVICE

CROSS-REFERENCE TO RELATED APPLICATIONS

This application is the National Stage filing under 35 U.S.C. 371 of International Application No. PCT/KR2019/06302, filed on May 27, 2019, the contents of which are hereby incorporated by reference herein in its entirety.

TECHNICAL FIELD

The present invention relates to an electronic device. More particularly, the present invention relates to an electronic device used in virtual reality (VR), augmented reality (AR), mixed reality (MR), etc.

BACKGROUND ART

Virtual reality (VR) refers to a specific environment or situation which is similar to reality created by artificial technology using a computer, etc., but is not reality or the technology itself.

Augmented reality (AR) refers to technology that combines a virtual object or information with a real environment to make it look like an object in an original environment.

Mixed reality (MR) or hybrid reality refers to technology that combines a virtual world and a real world to make a new environment or new information. In particular, an interaction between in objects which exist in reality and virtuality in real time is referred to as the mixed reality.

In this case, a created virtual environment or situation stimulates five senses of a user and makes spatial and temporal experiences similar to the reality, thereby making the user freely enter a boundary between the reality and imagination. Further, the user is capable of interacting with objects implemented in such an environment, such as giving an operation or a command by using a device which actually exists in addition to immersion in such an environment.

In recent years, a research into a gear used in such a technical field has been actively conducted.

DISCLOSURE

Technical Problem

An embodiment of the present invention provides an electronic device used in virtual reality (VR), augmented reality (AR), mixed reality (MR), etc.

Furthermore, an embodiment of the present invention is to more enhance a wearing feeling of an electronic device such as a spectacle type by considering users having different head sizes depending on sex and age.

Technical Solution

According to an example of the present invention, an electronic device includes: a frame including at least one opening and worn on a human body of a user; a control unit fixed to the frame and generating an image; and a display unit fixed to the opening of the frame and showing the image to the user, in which the frame includes a front frame including the at least one opening and first and second side frames which extend in a first direction crossing the front frame at both ends of the front frame and are parallel to each other, and at least one of a first length of each of the first and second side frames and a first interval between the first side frame and the second side frame is adjustable.

Each of the first and second side frames may include a first portion connected to the front frame and extending in the first direction, a second portion including one end positioned adjacent to the end of the first portion, and the other end extended in the first direction and having a curve so as be mounted on the human body of the user, and a hinge coupling portion positioned between the first portion and the second portion and having one end hinge-coupled to the first portion and the other end hinge-coupled to the second portion.

Herein, while in a state in which the first portion and the second portion extend in the first direction is maintained the hinge coupling portion rotates inside the first portion and outside the second portion, the first length and the first interval may become smaller.

The outside of the end of the first portion may further include an extension portion which has a thickness smaller than a thickness of the first portion and extends toward the second portion, and the extension portion may overlap with the outside of the hinge coupling portion.

Two openings may be provided on the front frame, a front mount portion may be further included, which is positioned at a lower end between the two openings provided on the front frame, and a first height between the front mount portion and the front frame may be adjusted.

More specifically, an insertion groove which protrudes inwardly and has a depress groove provided at the lower end may be provided between the two openings in the front frame, and a protrusion inserted into the insertion groove may be provided at an upper portion of the front mount portion.

Here, as an example, an inner surface of the insertion groove of the front frame may have a thread groove structure, an outer surface of the protrusion of the front mount portion may have a thread groove which may be inserted into the thread groove of the insertion groove, and the first height may be adjusted by rotating the front mount portion.

Alternatively, as another example, a plurality of pin holes which is formed in the direction of the two openings and disposed spaced apart from each other in a height direction may be provided in the insertion groove of the front frame, the protrusion of the front mount portion may have a fixation pin inserted into any one of the plurality of pin holes, and the first height may be adjusted by inserting the fixation pin of the front mount portion into any one pin hole of the plurality of pin holes.

each of the first and second side frames may include a first portion connected to the front frame and extending in the first direction, and a second portion including one end is positioned adjacent to the end of the first portion, and the other end extended in the first direction having a curve so as be mounted on the human body of the user, and one end of the second portion may include an extension portion inserted into the end of the first portion and coupled to the first portion and the extension portion has a latch hole which elongates, and the end of the first portion may have a latch projection inserted into the latch groove of the extension portion of the second portion.

Here, the latch hole may elongate in the first direction or elongate with the curve in the diagonal direction with respect to the first direction.

Advantageous Effects

The present invention has an advantage in that an electronic device has a structure in which a first length of each of first and second side frames or a first interval between the first and second side frames is adjustable to more enhance a user wearing feeling of the electronic device and more enhance wearing stability.

An additional range of an applicability of the present invention will be apparent from the following detailed description. However, since various changes and modifications can be clearly appreciated by those skilled in the art within the spirit and the scope of the present invention, the detailed description and a specific embodiment such as a preferred embodiment of the present invention should be appreciated as being just given as an example.

MODE FOR INVENTION

Figure 1:
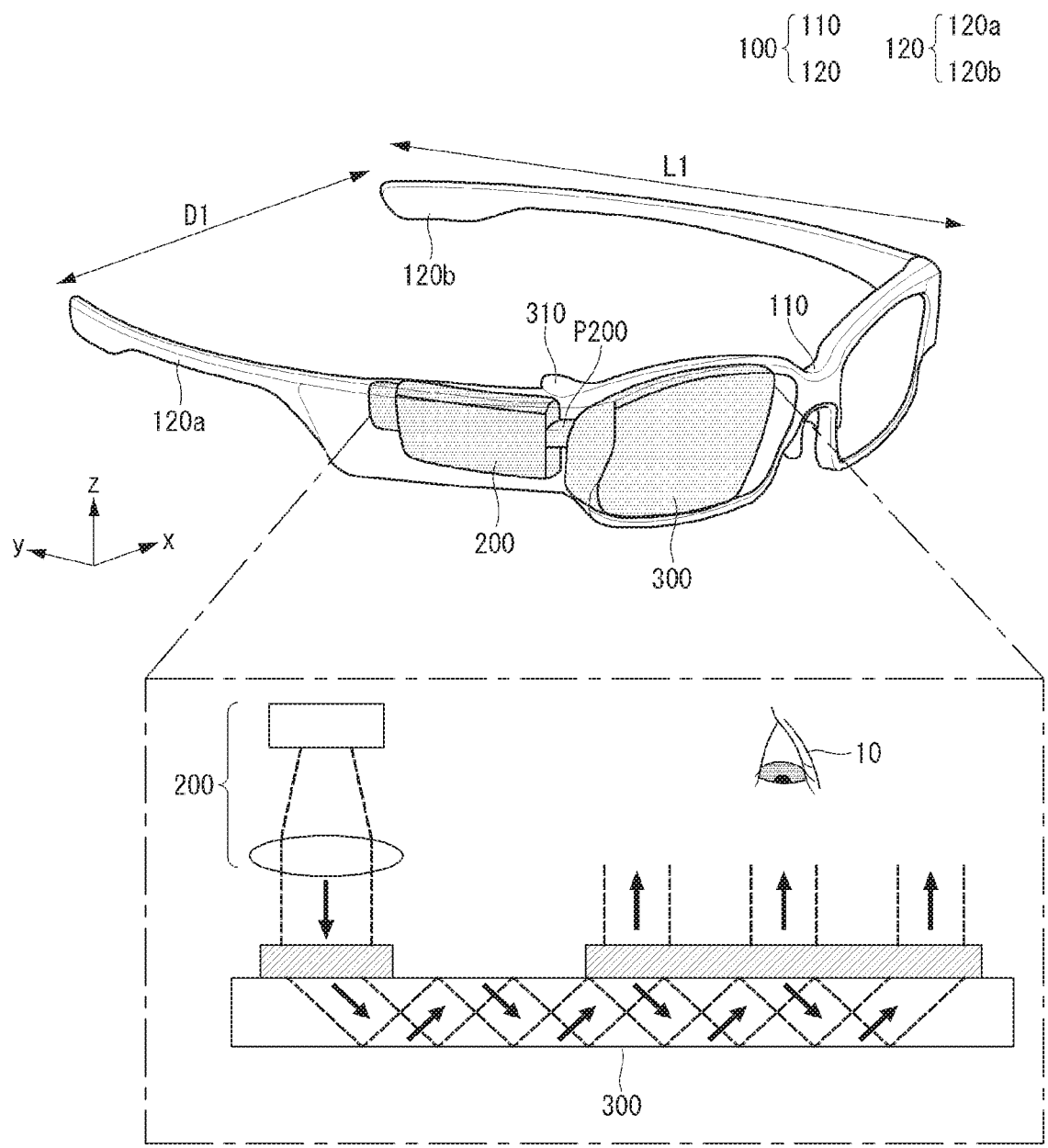
FIG. 1 is a diagram for describing an electronic device according to an example of the present invention.

Hereinafter, embodiments disclosed in this specification will be described in detail with reference to the accompanying drawings and the same or similar components are denoted by the same reference numerals regardless of a sign of the drawing, and duplicated description thereof will be omitted.

Further, in describing the embodiment disclosed in this specification, a detailed description of related known technologies will be omitted if it is determined that the detailed description makes the gist of the exemplary embodiment disclosed in this specification unclear. Further, it is to be understood that the accompanying drawings are just used for easily understanding the exemplary embodiments disclosed in this specification and a technical spirit disclosed in this specification is not limited by the accompanying drawings and all changes, equivalents, or substitutes included in the spirit and the technical scope of the present invention are included.

FIG. 1 is a diagram for describing an electronic device according to an example of the present invention.

As illustrated in FIG. 1, the electronic device according to an example of the present invention may include a frame 100, a control unit 200, and a display unit 300.

As illustrated in FIG. 1, the frame 100 may have a glass form worn on a face in a human body of a user 10, but the present invention is not limited thereto and the frame 100 may have a form such as goggles, etc., which are worn in close contact with the face of the user 10, etc.

Such a frame 100 may include a front frame 110 having at least one opening and first and second side frames 120 which extend in a first direction y intersecting the front frame 110 and are parallel to each other.

The control unit 200 may generate an image to be shown to the user 10 or a video in which the images are continued. Such a control unit 200 may include an image source panel generating the image and a plurality of lenses which diffuses and converges light generated from the image source panel. A detailed structure of the control unit 200 will be described in detail in FIG. 2 below.

Such a control unit 200 may be fixed to any one side frame 120 of the first and second side frames 120. As an example, the control unit 200 may be fixed to an inside or an outside of any one side frame 120 or embedded and integrally formed in any one side frame 120.

The display unit 300 may serve to show the image generated by the control unit 200 to the user 10 and may be made of a translucent glass material in order to allow the user 10 to see an external environment through an opening while showing the image to the user 10.

Such a display unit 300 may be inserted into or fixed to the opening included in the front frame 110 or positioned a rear surface (i.e., between the opening and the user 10) of the opening to be fixed to and provided in the front frame 110. In the present invention, as an example, a case where the display unit 300 is positioned on the rear surface of the opening and fixed to the front frame 110 is illustrated as an example.

As illustrated in FIG. 1, in such an electronic device, when image light for the image is incident on one side of the display unit 300 by the control unit 200, the image light is emitted to the other side through the display unit 300 to show the image generated by the control unit 200 to the user 10.

As a result, the user 10 may view the image generated by the control unit 200 simultaneously while viewing the external environment through the opening of the frame 100.

Since the control unit 200 generating the image is provided on any one side frame of the first and second side frames 120, such an electronic device may be relatively heavier than general glasses or goggles.

As a result, in order to cope with a difference of various head circumferences according to human body characteristics of the user 10, the electronic device according to an example of the present invention may have a structure in which at least one of a first length L1 of each of the first and second side frames or a first interval D1 between the first side frame 120 and the second side frame 120 is adjustable. As an example, the electronic device may have a structure in which at least one of the first length L1 and the first interval D1 may increase or decrease. A detailed description thereof will be described in FIG. 8 or later after the control unit 200 and the display unit 300 are first described.

Figure 2:
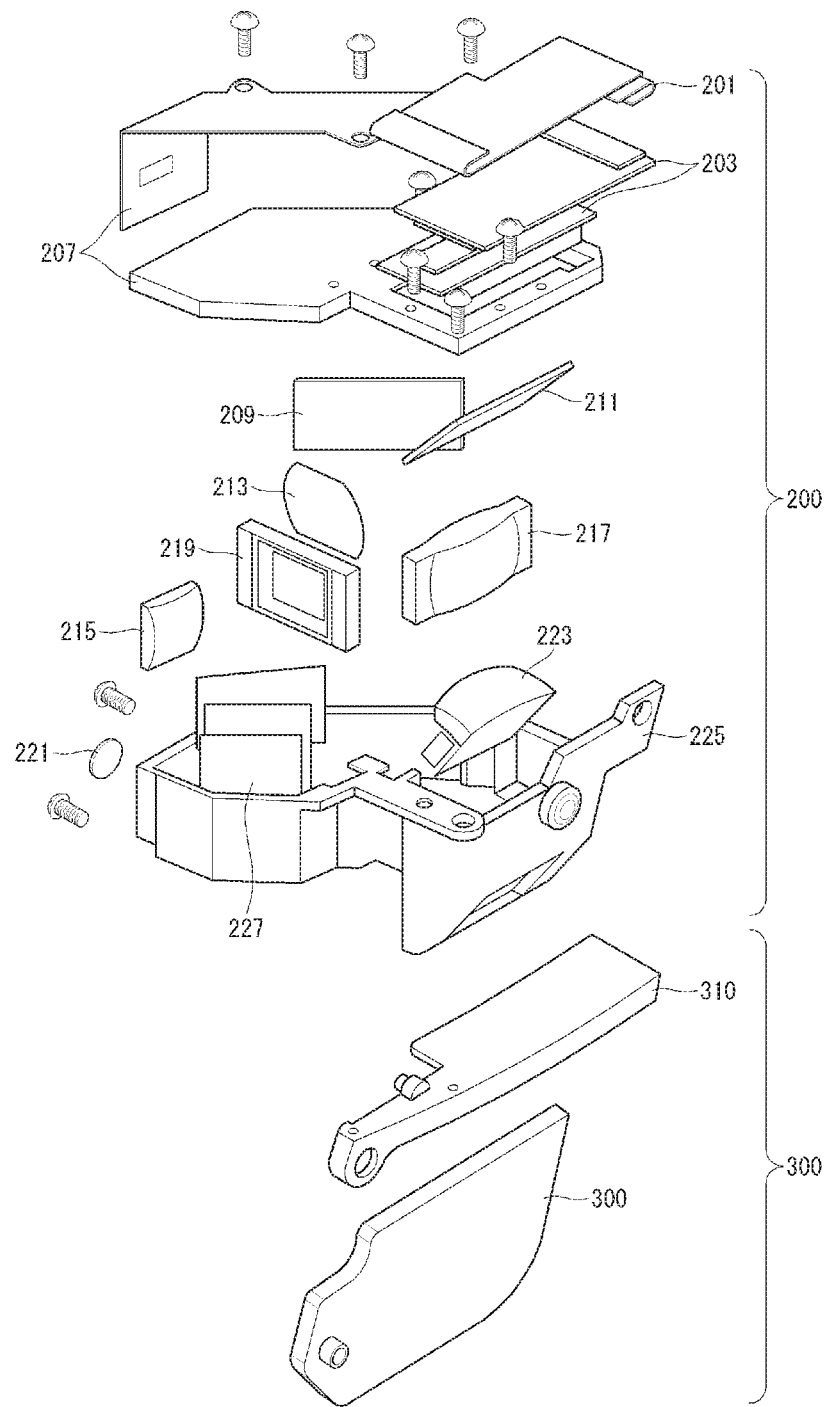
FIG. 2 is a diagram for describing an example of a control unit in FIG. 1.

FIG. 2 is a diagram for describing an example of a control unit 200 in FIG. 1.

As illustrated in FIG. 2, the control unit 200 may include a first cover 207 and a second cover 225 that protect components inside the control unit 200 and form an outer shape of the control unit 200 and include a driving unit 201, an image source panel 203, a polarizing beam splitter filter (PBSF) 211, a mirror 209, a plurality of lenses 213, 215, 217, and 221, a fly eye lens (FEL) 219, a dichroic filter 227, and a freeform prism projection lens (FPL) 223 inside the first cover 207 and the second cover 225.

The first cover 207 and the second cover 225 may include a space in which the driving unit 201, the image source panel 203, the polarizing beam splitter filter (PBSF) 211, the mirror 209, the plurality of lenses 213, 215, 217, and 221, the fly eye lens (FEL) 219, and the freeform prism projection lens (FPL) 223 may be provided and package the driving unit 201, the image source panel 203, the polarizing beam splitter filter (PBSF) 211, the mirror 209, the plurality of lenses 213, 215, 217, and 221, the fly eye lens (FEL) 219, and the freeform prism projection lens (FPL) 223, which may be fixed to any one side frame 120a or 120b.

The driving unit 201 may supply a driving signal for controlling a video or image displayed on the image source panel 203 and interlock with a separate module driving chip provided inside the control unit 200 or outside the control unit 200. As an example, such a driving unit 201 may be provided in a form of a flexible printed circuits board (FPCB) and the FPCB may include a heatsink that discharges heat generated during driving to the outside.

The image source panel 203 may generate the image and emit light according to the driving signal provided by the driving unit 201. To this end, as the image source panel 203, a liquid crystal display (LCD) panel may be used or an organic light emitting diode (LED) panel may be used.

The polarizing beam splitter filter (PBSF) 211 may separate the image light for the image generated by the image source panel 203 according to a rotational angle or block some image light or pass other some image light. Therefore, for example, when the image light emitted from the image source panel 203 includes a P wave as horizontal light and an S wave as vertical light, the polarizing beam splitter filter (PBSF) 211 may separate the P wave and the S wave into different paths or pass any one image light and block the other one image light. As an example, the polarizing beam splitter filter (PBSF) 211 may be provided as a cube type or a plate type.

The polarizing beam splitter filter (PBSF) 211 provided as the cube type may filter the image light formed by the P wave and the S wave and separate the filtered image light into different paths and the polarizing beam splitter filter (PBSF) 211 provided as the plate type may pass any one image light of the P wave and the S wave and block the other one image light.

The mirror 209 may reflect the image light polarized and separated by the polarizing beam splitter filter (PBSF) 211 and collect the reflected image light and make the collected image light be incident in the plurality of lenses 213, 215, 217, and 221.

The plurality of lenses 213, 215, 217, and 221 may include a convex lens and a concave lens and as an example, may include an I-type lens and a C-type lens. The plurality of lenses 213, 215, 217, and 221 repeatedly diffuses and converges the incident image light to enhance straightness of the image light.

The fly eye lens (FEL) 219 may receive the image light passing through the plurality of lenses 213, 215, 217, and 221 and emit the image light so that illuminance uniformity is more enhanced and extend an area where the image light having uniform illuminance.

The dichroic filter 227 may include a plurality of film layers or lens layers and the dichroic filter 227 may transmit light of a specific wavelength band of the image light incident from the fly eye lens 219, reflect light of the remaining specific wavelength band to correct a color sense of the image light. The image light that transmits the dichroic filter 227 may be emitted to the display unit 300 through the freeform projection prism projection lens 223.

The display unit 300 may receive the image light emitted from the control unit 200 and emit the image incident in a direction in which an eye of the user 10 is positioned so that the user 10 views the incident image light with an eye thereof.

The display unit 300 may be fixed to the front frame 110 through a separate fixation member or fixed into the opening provided in the front frame 110.

Hereinafter, in FIGS. 3 to 6, various forms of the display unit 300 and various schemes in which the incident image light is emitted will be described.

Figure 3:
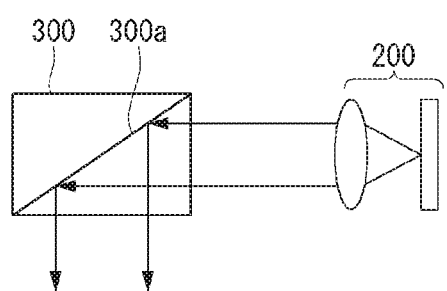
FIGS. 3 to 5 are diagrams for describing various display schemes applicable to a display unit according to an example of the present invention.
Figure 3:
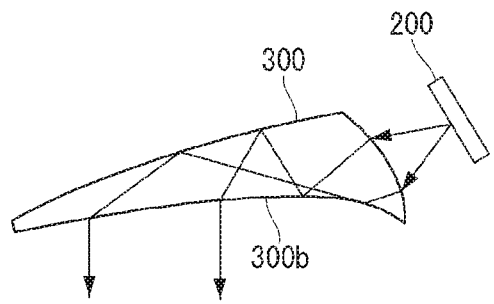
Figure 3:
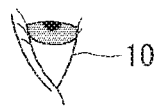
Figure 3:
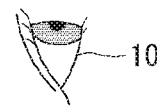
Figure 4:
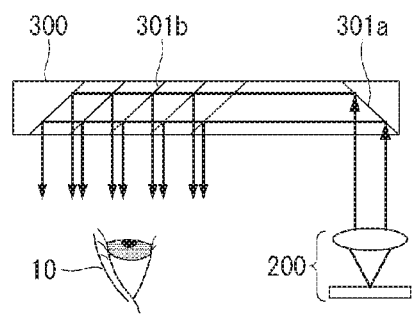
Figure 4:
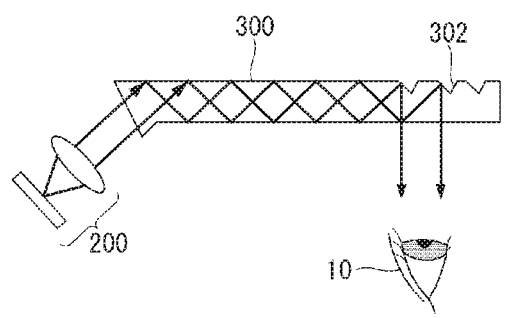
Figure 4:
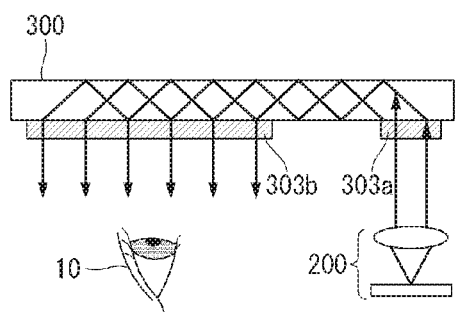
Figure 4:
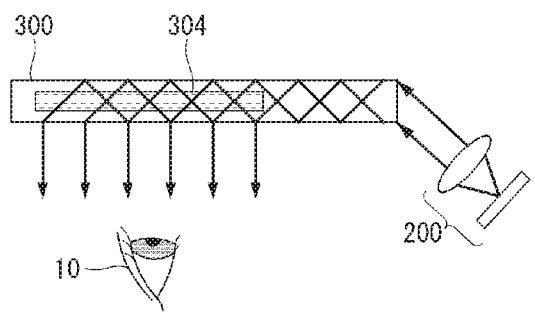
Figure 4:
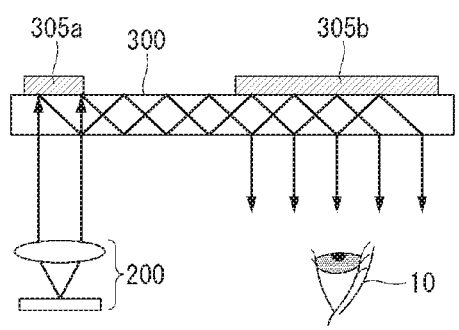
Figure 4:
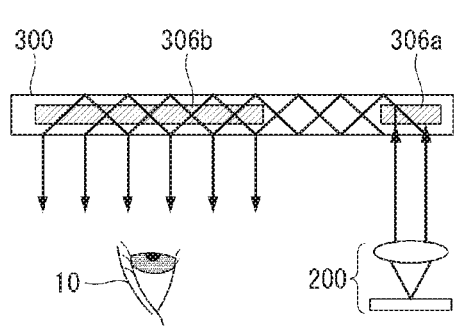
Figure 5:
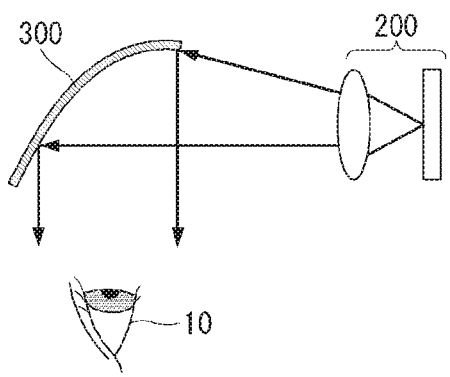
Figure 5:
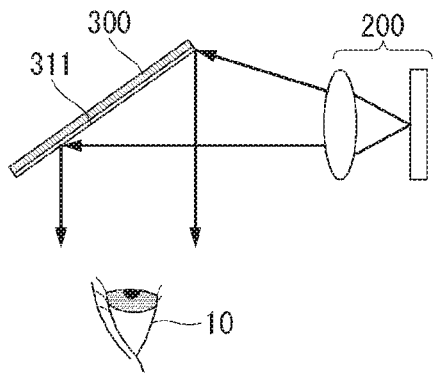
Figure 5:
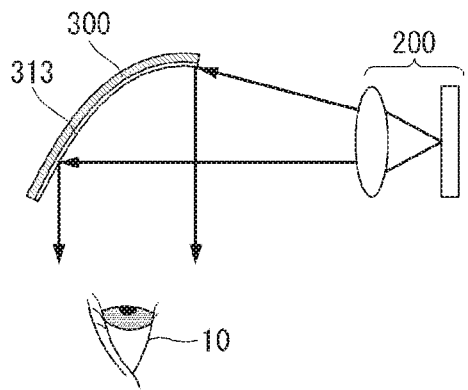

FIGS. 3 to 5 are diagrams for describing various display schemes applicable to a display unit 300 according to an example of the present invention.

More specifically, FIG. 3 is a diagram for describing an example of a prism type optical element applicable to a display unit 300 according to an example of the present invention, FIG. 4 is a diagram for describing an example of a waveguide type optical element applicable to a display unit 300 according to an example of the present invention, and FIG. 5 is a diagram for describing an example of a surface reflection type optical element applicable to a display unit 300 according to an example of the present invention.

The display unit 300 according to an example of the present invention may be translucent so as for the user 10 to visually recognize the external environment and recognize the image generated by the control unit 200 and as an example, may be formed as an optical element including a material such as the glasses.

As the optical element applicable to the display unit 300 according to an example of the present invention, the optical elements illustrated in FIGS. 3 to 5 may be used and besides, optical elements of various schemes including a retina scanning scheme, etc., may be used.

As illustrated in FIG. 3, the prism type optical element may be used in the display unit 300 according to an example of the present invention.

As an example, as illustrated in FIG. 3(a), as the prism type optical element, a flat type glass optical element may be used in which a surface on which the image light is incident and a surface from which the image light is emitted are flat or as illustrated in FIG. 3(b), a freeform glass optical element may be used in which a surface 300b from which the image light is emitted is formed by a curved surface.

The flat type glass optical element may receive the image light generated by the control unit 200 on a flat side surface and reflect the incident image light through a total reflection mirror 300a provided therein, and emit the reflected image light toward the user 10. Here, the total reflection mirror 300a provided in the flat type glass optical element may be formed in the flat type glass optical element by a laser.

The freeform glass optical element is configured in such a manner that a thickness decreases as a distance from the incident surface increases to receive the image light generated by the control unit 200 through a side surface having the curved surface and totally reflect the received image light therein, and emit the totally reflected image light toward the user 10.

As illustrated in FIG. 4, a waveguide type optical element or a light guide optical element (LOE) may be used in the display unit 300 according to an example of the present invention.

As an example, the waveguide or light guide type optical element may include a segmented beam splitter type glass optical element illustrated in FIG. 4(a), a sawtooth prism type glass optical element illustrated in FIG. 4(b), a glass optical element having a diffractive optical element (DOE) illustrated in FIG. 4(c), a glass optical element having a hologram optical element (HOE) illustrated in FIG. 4(d), a glass optical element having a passive grating illustrated in FIG. 4(e), and a glass optical element having an active grating illustrated in FIG. 4(f).

The segmented beam splitter type glass optical element illustrated in FIG. 4(a) may include a total reflection mirror 301a at a side on which an optical image is incident and a segmented beam splitter 301b at a side from which the optical image is emitted, in the glass optical element as illustrated in FIG. 4(a).

As a result, the optical image generated by the control unit 200 is totally reflected by the total reflection mirror 301a in the glass optical element, the totally reflected optical image is guided in a longitudinal direction of the glass and partially separated and emitted by the segmented reflection mirror 301b to be recognized by a vision of the user 10.

In the sawtooth prism type glass optical element illustrated in FIG. 4(b), the image light of the control unit 200 is incident on a side surface of the glass in a diagonal direction and totally reflected in the glass and emitted to the outside of the glass by a sawtooth shaped concavity and convexity 302 provided at a side to which the optical image is emitted to be recognized by the vision of the user 10.

In the glass optical element having the diffractive optical element (DOE) illustrated in FIG. 4(c), a first diffractive unit 303a may be provided on a surface on which the optical image is incident and a second diffractive unit 303b may be provided on a surface from which the optical image is emitted. The first and second diffractive units 303a and 303b may be provided in a form in which a specific pattern is patterned or a separate diffractive film is attached onto the surface of the glass.

As a result, the optical image generated by the control unit 200 is diffracted while being incident, totally reflected, and guided in the longitudinal direction of the glass through the first diffractive unit 303a and emitted through the second diffractive unit 303b to be recognized by the vision of the user 10.

In the glass optical element having the hologram optical element (HOE) illustrated in FIG. 4(d), an out-coupler 304 may be provided in a glass at the side from which the optical image is emitted. As a result, the optical image is incident from the control unit 200 in the diagonal direction through the side surface of the glass, totally reflected and guided in the longitudinal direction of the glass, and emitted by the out-coupler 304 to be recognized by the vision of the user 10. A structure of the hologram optical element may be changed little by little and subdivided into a structure having the passive grating and a structure having the active grating.

The glass optical element having the passive grating illustrated in FIG. 4(e) may include an in-coupler 305a provided on a surface opposite to the side on which the optical image is incident and an out-coupler 305b provided on a surface opposite to the glass surface from which the optical image is emitted. Here, the in-coupler 305a and the out-coupler 305b may be provided in a film form having the passive grating.

As a result, the optical image incident on the glass surface at the side of the glass on which the optical image is incident is totally reflected and guided in the longitudinal direction of the glass by the in-coupler 305a provided on the opposite surface and emitted through the opposite surface of the glass by the out-coupler 305b to be recognized by the vision of the user 10.

The glass optical element having the active grating illustrated in FIG. 4(f) may include an in-coupler 306a formed as the active grating in the glass at the side on which the optical image is incident and an out-coupler 306b formed as the active grating in the glass at the side from which the optical image is emitted.

As a result, the optical image incident on the glass is totally reflected and guided in the longitudinal direction of the glass by the in-coupler 306a and emitted to the outside of the glass by the out-coupler 306b to be recognized by the vision of the user 10.

As the surface reflection type optical element applicable to the display unit 300 according to an example of the present invention, a freeform combiner type illustrated in FIG. 5(a), a flat HOE type illustrated in FIG. 5(b), and a freeform HOE type illustrated in FIG. 5(c) may be used.

As the freeform combiner type surface reflection type optical element illustrated in FIG. 5(a), in order to serve as a combiner, a freeform combiner glass 300 may be used in which a plurality of flat surfaces having different incident angles of the optical image is formed as one glass 300 and formed to have the curved surface as a whole. In the freeform combiner glass 300, the incident angle of the optical image may be incident differently for each area and emitted to the user 10.

In the flat HOE type surface reflection type optical element illustrated in FIG. 5(b), a hologram optical element (HOE) 311 may be provided to coated or patterned on the surface of the flat glass and the optical image incident by the control unit 200 is reflected on the surface of the glass through the hologram optical element 311 and emitted toward the user 10 through the hologram optical element 311 again.

In the freeform HOE type surface reflection type optical element illustrated in FIG. 5(c), a hologram optical element (HOE) 313 may be provided to be coated or patterned on the surface of a freeform-shaped glass and an operation principle may be the same as that described in FIG. 5(b).

As described above, in the display unit 300 according to an example of the present invention, one of the prism type optical element, the waveguide type optical element, the optical guide optical element (LOE), or the surface reflection type optical element may be selected and used.

In the electronic device according to an example of the present invention, which includes the control unit 200 and the display unit 300, in order to more enhance the wearing sense of the user 10, at least one of a first length L1 of each of the first and second side frames 120 or a first interval D1 between the first side frame 120 and the second side frame 120 is adjustable. This will be described in more detail.

Figure 6:
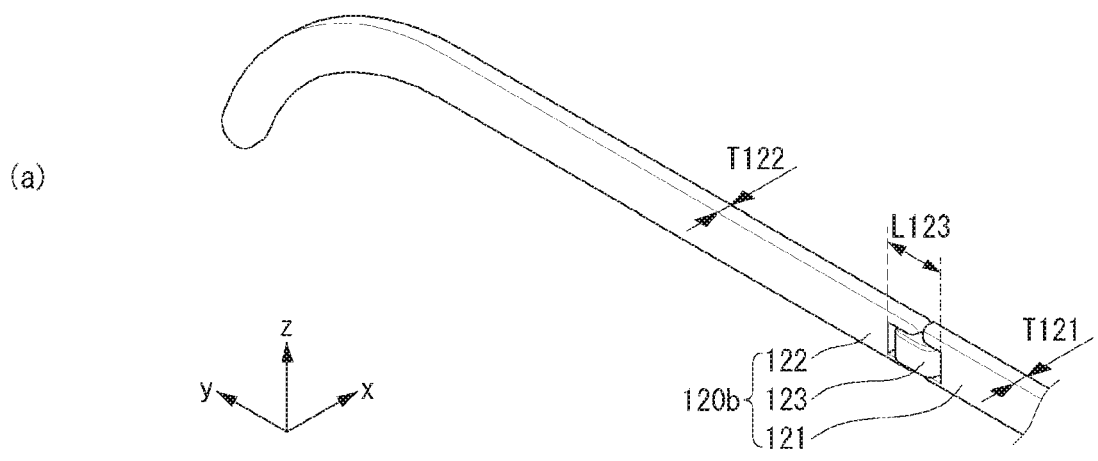
FIGS. 6 and 7 are diagrams for describing an example for first and second side frames of a frame in an electronic device according to an example of the present invention.
Figure 6:
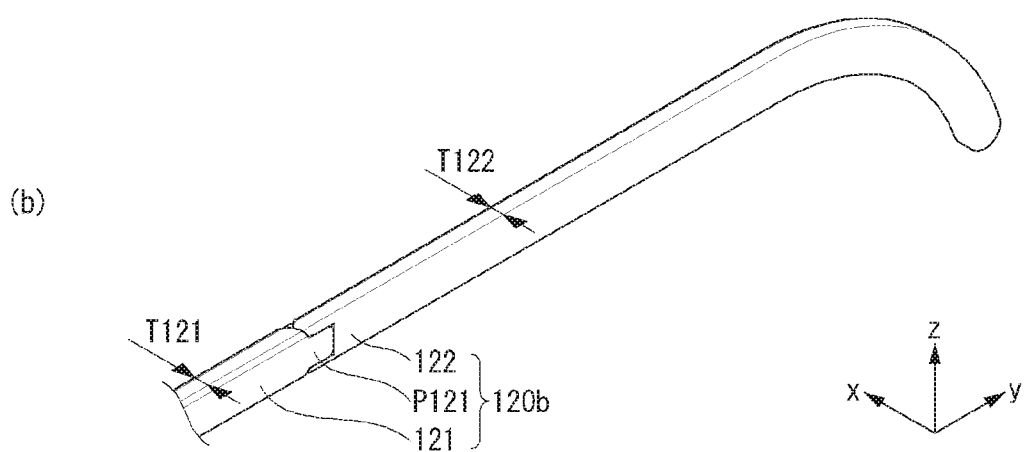
Figure 7:
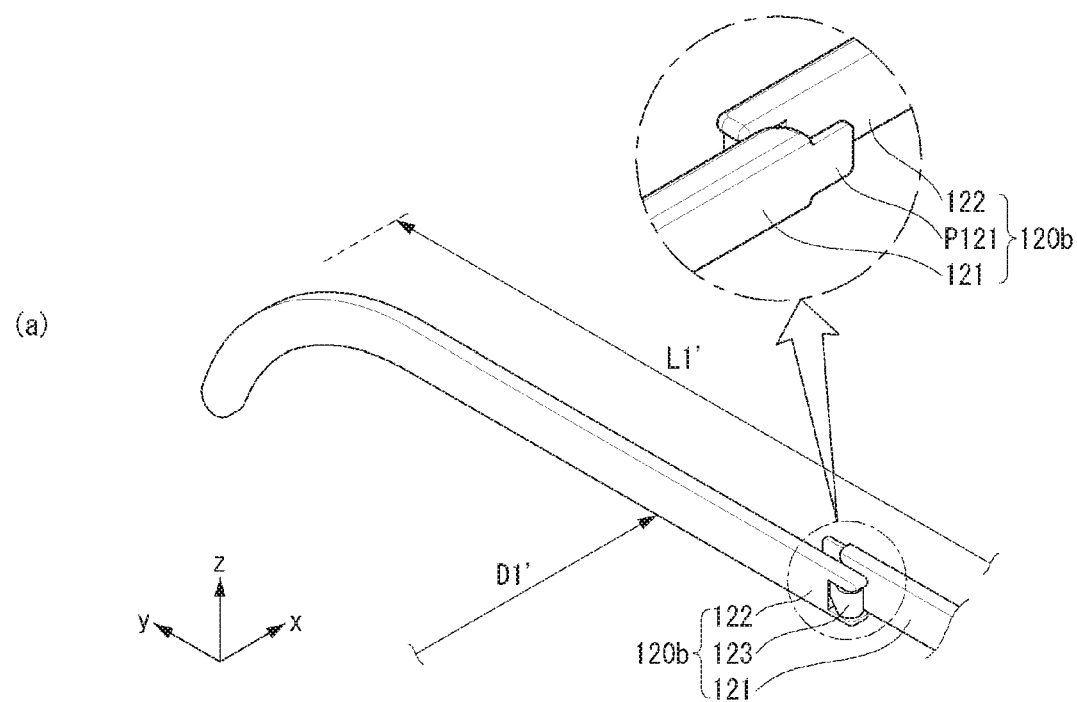
Figure 7:
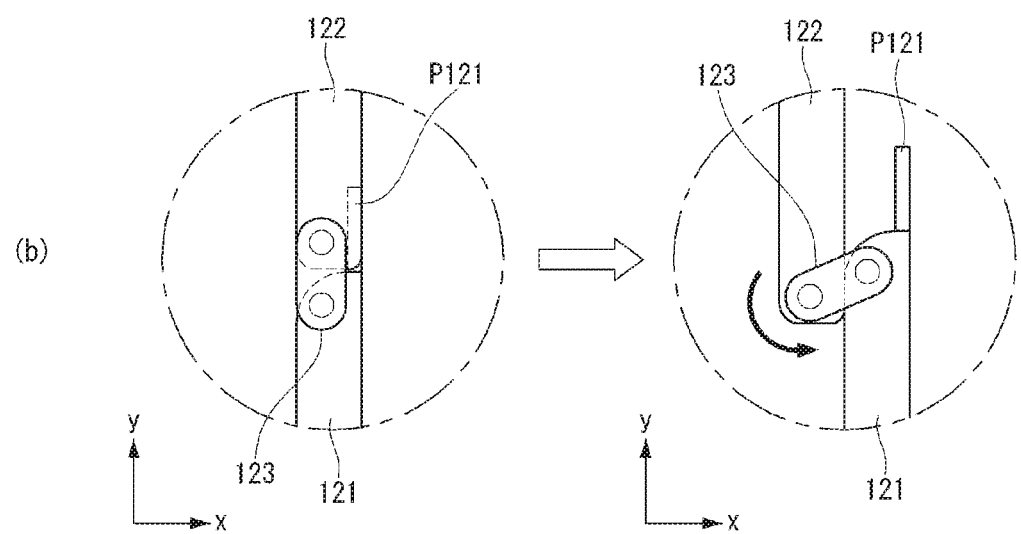

FIGS. 6 and 7 are diagrams for describing an example for first and second side frames 120 of a frame 100 in an electronic device according to an example of the present invention.

In FIGS. 6 and 7, as an example of the first and second side frames 120 illustrated in FIG. 1, a second side frame 120b is illustrated as an example, but a first side frame 120a may also be configured similarly to the second side frame 120b. Accordingly, hereinafter, in FIGS. 6 and 7, the second side frame 120b is illustrated as an example, but the first and second frames 120 will be described simultaneously.

The frame 100 according to an example of the present invention may include a front frame 110 to be worn on a face of the human body of the user 10, i.e., worn on a front surface of the face and first and second side frames 120 worn on a side surface of the human body of the user 10, i.e., the side of the face.

The frame 100 according to an example of the present invention may have a configuration in which at least one of the first length L1 of each of the first and second side frames 120 or the first interval D1 between the first side frame 120 and the second side frame 120 is adjustable by considering various characteristics of the user 10 having a head part with different sizes according to the sex or the age.

To this end, each of the first and second side frame 120 may include a first portion 121, a second portion 122, and a hinge coupling portion 123 as illustrated in FIG. 6.

The first portion 121 may be connected to the front frame 110 and may extend in a first direction y. Here, the first direction y may be a direction crossing the longitudinal direction of the front frame 110 and a direction parallel to a face side of the user 10.

One end of the second portion 122 may be positioned adjacent to the end of the first portion 121 and extend in the first direction y and have a curve so that the other end puts on a part of the human body of the user 10, for example, an ear.

The hinge coupling portion 123 is positioned between the first portion 121 and the second portion 122, and one end may be hinge-coupled to the first portion 121 and the other end may be hinge-coupled to the second portion 122.

Here, a length L123 of the hinge coupling portion 123 may be larger than a thickness T121 of the first portion 121 or a thickness T122 of the second portion 122. More specifically, the length L123 of the hinge coupling portion 123 may be equal to or larger than a sum (T121+T122) of the thicknesses of the first portion 121 and the second portion 122 and smaller than twice the sum (T121+T122) of the thicknesses of the first portion 121 and the second portion 122.

In each of the first and second side frames 120, as illustrated in FIG. 7, in a state is maintained in which the first portion 121 and the second portion 122 of the frame 100 extend the first direction y, while the hinge coupling portion 123 rotates inside the first portion 121 and outside the second portion 122, the first length and the second interval may become smaller.

That is, as illustrated in FIG. 7, while the hinge coupling portion 123 rotates, the first length may be reduced from L1 to L1' and the first interval may be reduced from D1 to D1'.

Here, the end of the first portion 121 may further include an extension portion P121 which extends toward the second portion 122 with a thickness smaller than a body thickness T121 of the first portion 121 and the extension portion P121 may overlap with the outside of the hinge coupling portion 123.

The extension portion P121 of the first portion 121 may prevent the hinge coupling portion 123 from being bent to the outside of the first portion 121 and guide the hinge coupling portion 123 to be bent only to the inside of the first portion 121.

Figure 8:
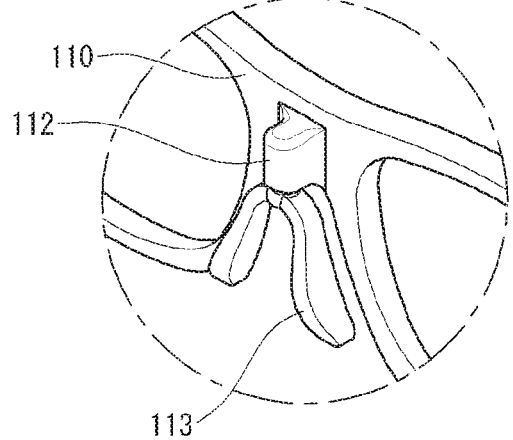
FIG. 8 is a diagram for describing an example of a front mount portion of a front frame in an electronic device according to an example of the present invention.
Figure 8:
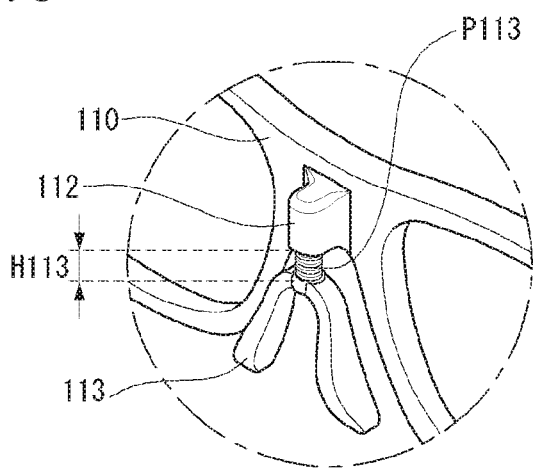
Figure 8:
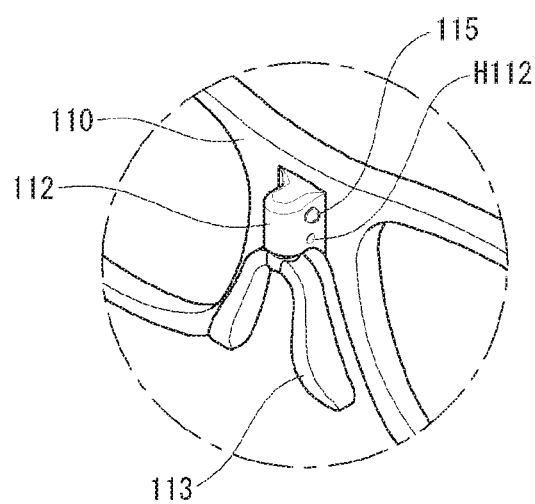
Figure 8:
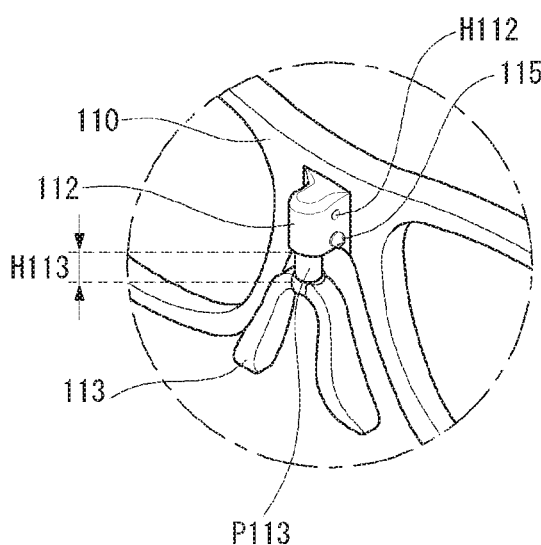

FIG. 8 is a diagram for describing an example of a front mount portion 113 of a front frame 110 in an electronic device according to an example of the present invention.

As illustrated in FIG. 1 described above, there may be two openings provided on the front frame 110 in the frame 100 according to an example of the present invention.

Here, the front frame 110 according to an example of the present invention may include a front mount portion 113 as illustrated in FIG. 8 and a first height H113 between the front mount portion 113 and the front frame 110 may be adjusted.

That is, as illustrated in FIG. 8, the first height H113 of the front mount portion 113 fixed to the front frame 10 may increase or decrease.

More specifically, the front frame 110 according to an example of the present invention may include an insertion groove 112 which protrudes to the inside where the user 10 is positioned between two openings and into which a part of the front mount portion 113 is inserted. The insertion groove 112 may have a length in a vertical direction and include a depressed groove so that a part of the front mount portion 113 is inserted into a lower end thereof.

The front mount portion 113 may have the length in both lower diagonal directions so as to be mounted on a nose of the user 10 and a protrusion P113 inserted into the depressed groove of the insertion groove 112 in an upper middle portion.

Here, as an example, an inner surface of the insertion groove 112 of the front frame 110 may have a thread groove structure, an outer surface of the protrusion P113 of the front mount portion 113 may have a thread groove which may be inserted into the thread groove of the insertion groove 112, and the first height H113 may be adjusted by rotating the front mount portion 113.

Alternatively, as another example, a plurality of pin holes H112 which is formed in the direction of two openings and disposed spaced apart from each other in a height direction may be provided in the insertion groove 112 of the front frame 110, a fixation pin 115 inserted into any one of the plurality of pin holes H112 may be provided in the protrusion P113 of the front mount portion 113, and the first height H113 may be adjusted by inserting the fixation pin 115 of the front mount portion 113 into any one pin hole H112 among the plurality of pin holes H112.

As a result, the electronic device according to the present invention may be more stably worn on the face of the user 10.

The first and second side frames 120 and the front frame 110 according to an example of the present invention have been described so far. However, the present invention is not particularly limited to such an example and as an example, in FIG. 6, a case where both the first length L1 of each of the first and second side frames 120 and the first interval D1 are adjustable is described as an example, but only the first length L1 of each of the first and second side frames 120 may be changed. This will be described below in more detail.

Figure 9:
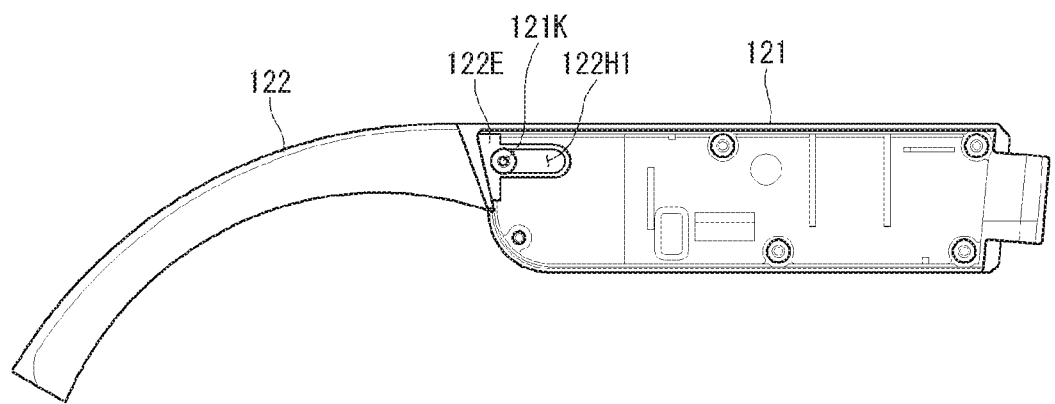
FIGS. 9 and 10 are diagrams for describing a modification example for first and second side frames in an electronic device according to an example of the present invention.
Figure 9:
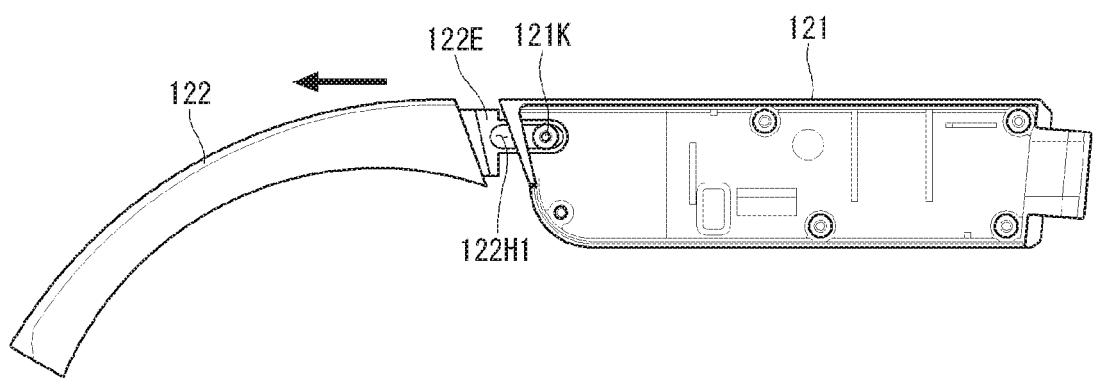
Figure 10:
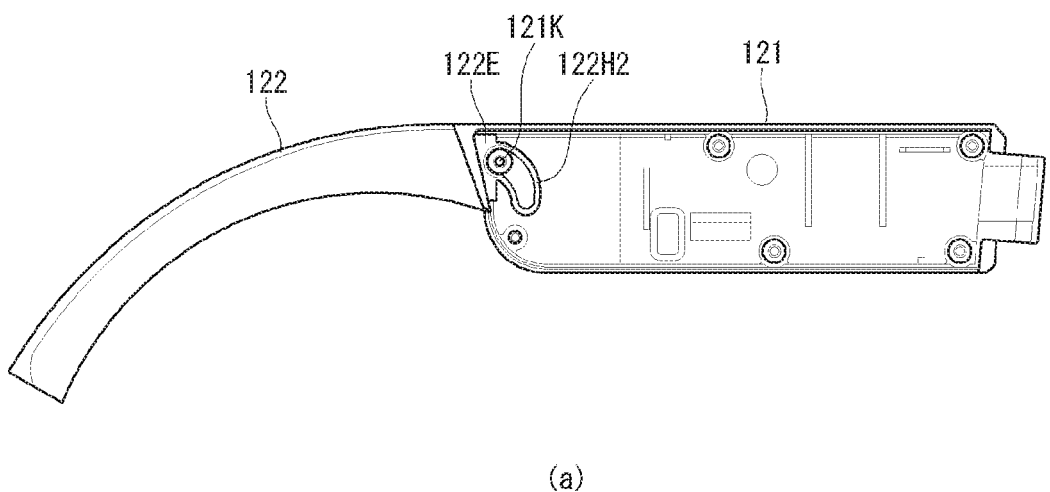
Figure 10:
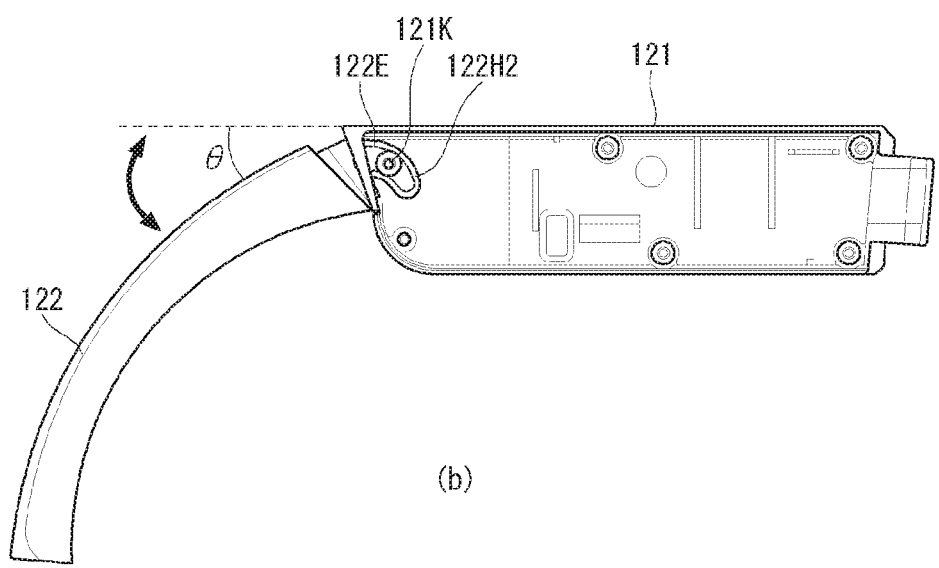

FIGS. 9 and 10 are diagrams for describing a modification example for first and second side frames 120 in an electronic device according to an example of the present invention.

In FIG. 9, the first side frame 120 of the first and second side frames 120 illustrated in FIG. 1 above is described as an example, but the description may be similarly applied even to the second side frame 120.

Each of the first and second side frame 120 according to the modification example of the present invention may include a first portion 121 and a second portion 122 and the hinge coupling portion 123 may be configured to be omitted differently from FIG. 6 above.

More specifically, as illustrated in FIGS. 9 and 10, the first portion 121 of each of the first and second side frames may be connected to the front frame 110 and may extend in the first direction y and in the second portion 122, one end may be positioned adjacent to the end of the first portion 121 and extends in the first direction y and the other end may have a curve so as be mounted on the human body of the user 10.

As an example, as illustrated in FIG. 9, one end of the second portion 122 may include an extension portion 122E inserted into the end of the first portion 121 and coupled to the first portion 121. Here, the extension portion 122E of the second portion 122 may include a latch hole 122H1 which elongates in the first direction y and the end of the first portion 121 may include a latch projection 121K inserted into a latch groove provided at the extension portion 122E of the second portion 122.

As a result, according to the convenience of the user 10, since the lengths of the first and second side frames 120 may be adjusted, the wearing sense of the electronic device may be further enhanced.

Further, here, a latch hole 122H2 may elongate with the curve in the diagonal direction with respect to the first direction y as illustrated in FIG. 10.

In this case, since an angle of the second portion 122 may be adjusted in each of the first and second side frames 120, the length may be adjusted and the angle of the second portion 122 mounted on the ear of the user 10 may also be adjusted, thereby further enhancing the wearing sense of the electronic device.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. An electronic device comprising:
   a frame including at least one opening and worn on a human body of a user;
   a control unit fixed to the frame and generating an image; and
   a display unit fixed to the opening of the frame and showing the image to the user,
   wherein the frame includes a front frame including the at least one opening and first and second side frames extended in a first direction crossing the front frame at both ends of the front frame, and the first and second side frames parallel to each other,
   wherein a first length of each of the first and second side frames is adjustable,
   wherein each of the first and second side frames includes:
      a first portion connected to the front frame and extending in the first direction, and,
      a second portion including one end is positioned adjacent to the end of the first portion, and the other end extended in the first direction and having a curve so as be mounted on the human body of the user,
   wherein one end of the second portion includes an extension portion inserted into the end of the first portion and coupled to the first portion, and the extension portion has a latch hole which elongates,
   wherein the end of the first portion has a latch projection inserted into the latch hole of the extension portion of the second portion, and
   wherein the latch hole elongates with the curve in the diagonal direction with respect to the first direction.

2. The electronic device of claim 1, wherein two openings are provided on the front frame,
   wherein a front mount portion is further included, which is positioned at a lower end between the two openings provided on the front frame, and
   wherein a first height between the front mount portion and the front frame is adjusted.

3. The electronic device of claim 2, wherein an insertion groove which protrudes inwardly and has a depress groove provided at the lower end is provided between the two openings in the front frame, and
   wherein a protrusion inserted into the insertion groove is provided at an upper portion of the front mount portion.

4. The electronic device of claim 3, wherein an inner surface of the insertion groove of the front frame has a thread groove structure,
   wherein an outer surface of the protrusion of the front mount portion has a thread groove which may be inserted into the thread groove of the insertion groove, and
   wherein the first height is adjusted by rotating the front mount portion.

5. The electronic device of claim 3, wherein a plurality of pin holes which is formed in the direction of the two openings and disposed spaced apart from each other in a height direction is provided in the insertion groove of the front frame,
   wherein the protrusion of the front mount portion has a fixation pin inserted into any one of the plurality of pin holes, and
   wherein the first height is adjusted by inserting the fixation pin of the front mount portion into any one pin hole of the plurality of pin holes.

* * * * *